No. 738,719. Patented September 8, 1903.

UNITED STATES PATENT OFFICE.

LOTHAR FIEDLER, OF LONDON, ENGLAND, ASSIGNOR OF ONE-HALF TO GEORGE PEARSON, OF PITFOUR, ILFORD, ENGLAND.

GALVANIC CELL.

SPECIFICATION forming part of Letters Patent No. 738,719, dated September 8, 1903.

Application filed December 22, 1902. Serial No. 136,282. (No specimens.)

*To all whom it may concern:*

Be it known that I, LOTHAR FIEDLER, a subject of the Emperor of Germany, residing at 71 Huntley street, Tottenham Court Road, London, in the county of Middlesex, England, have invented a new and useful Improvement in Galvanic Cells, of which the following is a specification.

The present invention relates to a new electrode or element for galvanic cells and to a method or process for making same.

An electrode or element formed according to this invention is particularly applicable for use as the negative-pole electrode in secondary batteries of the lead-zinc genus.

The advantages accruing from the use of lighter metals than lead, as electrodes in secondary batteries, has long been known, and many attempts have been made to use the metal zinc as the negative-pole electrode in combination with a positive-pole electrode of other metal or material, usually copper, lead or carbon. The most successful combination has, however, been found in the combination of a zinc negative-pole electrode with the well-known positive-pole electrode of lead peroxid, ($PbO_2$;) but owing to the difficulty experienced in preventing the zinc from becoming eaten away by the electrolyte it has not been found possible to produce a reliable but commercially practicable cell of this type.

The advantages of the lead-zinc combination are slightly higher pressure (electromotive force)—*e. g.*, in a cell constructed with an electrode made according to this invention the electromotive force is about two and one-half volts as against two volts of the Planté type of lead cell and a very high capacity per unit of total weight compared with other types of secondary cells.

The present invention consists, essentially, in forming a negative electrode with an active surface of cyanid of zinc and mercury by electrodeposition.

According to this invention a plate of zinc, carbon, or other insoluble conducting material is treated as the cathode in a bath having approximately the following composition: zinc sulfate, ($ZnSO_4$,) one thousand grams; mercuric sulfate, ($HgSO_4$,) fifty grams; potassium cyanid, ($2KCy$), ten grams, made up with water to a density of 30° on a Baumé hydrometer.

The anode may be either carbon or zinc, and the strength of the bath during electrodeposition is kept at approximately a density of 30° Baumé by the addition of a concentrated solution of the materials employed and in or about the proportions stated, except when the anode is of zinc, in which case zinc sulfate is omitted from the solution.

It will be understood that in substitution of potassium cyanid any other suitable compound containing cyanogen (Cy) may be used.

The cyanogen set free from the potassium of the potassium cyanid combines with the zinc of the zinc sulfate, forming zinc cyanid, (CyZn,) which, combining with the mercury liberated from the mercuric sulfate, forms a mercuric cyanid of zinc (CyZnHg) or cyanid zinc amalgam and a solution containing potassium and sulfuric acid. The mercuric cyanid of zinc or cyanid-zinc amalgam is deposited on the cathode in a firm, even, and porous condition, and when used with a suitable electrolyte, as the negative-pole electrode in a lead-zinc cell, has no disposition to become detached from its support, giving rise to short-circuiting or to be deleteriously affected by local action when on open circuit. The electrolyte used in connection with negative-pole electrodes prepared in the manner hereinbefore set forth should, besides the usual proportion of sulfuric acid, ($H_2SO_4$,) contain a small proportion (about one-sixth part, by weight, of the acid solution employed) of mercuric sulfate.

What I claim, and desire to secure by Letters Patent, is—

1. The process herein described for producing a negative-pole electrode for a galvanic cell and possessing the properties described which consists in depositing by electrolytic action cyanid zinc amalgam upon a suitable support, as set forth.

2. The process herein described for producing a negative-pole electrode for a galvanic cell and possessing the properties described which consists in treating the electrode as a cathode in an electrolytic bath comprising a solution of zinc sulfate, ($ZnSO_4$,) mercuric sulfate, ($HgSO_4$,) and cyanogen, (Cy,) as set forth.

3. The process hereinbefore described for producing a negative-pole electrode for a galvanic cell and possessing the properties described which consists in treating the electrode as a cathode in an electrolytic bath comprising zinc sulfate ($ZnSO_4$) one thousand grams, mercuric sulfate ($HgSO_4$) fifty grams, potassium cyanid (2KCy) ten grams made up with water to a density of 30° Baumé, as set forth.

4. A negative-pole electrode for a galvanic cell formed by electrodepositing a cyanid-zinc amalgam on a suitable support, as set forth.

5. A zinc electrode for a galvanic cell formed with an electrodeposit of cyanid-zinc amalgam, as set forth.

LOTHAR FIEDLER.

Witnesses:
A. MILLWARD FLACK,
G. V. SYMES.